United States Patent
Mirsky

(10) Patent No.: US 10,938,964 B2
(45) Date of Patent: Mar. 2, 2021

(54) ROUTING PACKETS IN A RING COMMUNICATION NETWORK

(71) Applicant: ZTE Corporation, Shenzhen (CN)

(72) Inventor: Gregory Mirsky, Pleasanton, CA (US)

(73) Assignee: ZTE Corporation, Shenzhen (CN)

( * ) Notice: Subject to any disclaimer, the term of this patent is extended or adjusted under 35 U.S.C. 154(b) by 81 days.

(21) Appl. No.: 15/912,512

(22) Filed: Mar. 5, 2018

(65) Prior Publication Data

US 2019/0273813 A1 Sep. 5, 2019

(51) Int. Cl.

| | |
|---|---|
| H04L 12/28 | (2006.01) |
| H04L 29/06 | (2006.01) |
| H04L 12/801 | (2013.01) |
| H04L 12/803 | (2013.01) |
| H04L 12/741 | (2013.01) |
| H04L 12/42 | (2006.01) |

(52) U.S. Cl.
CPC .............. H04L 69/22 (2013.01); H04L 45/74 (2013.01); H04L 47/125 (2013.01); H04L 47/13 (2013.01); H04L 12/42 (2013.01)

(58) Field of Classification Search
None
See application file for complete search history.

(56) References Cited

U.S. PATENT DOCUMENTS

| | | | | |
|---|---|---|---|---|
| 9,762,488 B2* | 9/2017 | Previdi | ................. | H04L 45/745 |
| 2003/0048754 A1* | 3/2003 | Bruckman | ............ | H04L 12/427 370/252 |
| 2003/0072259 A1* | 4/2003 | Mor | ...................... | H04L 12/437 370/223 |
| 2006/0193328 A1* | 8/2006 | Rao | .......................... | H04L 12/18 370/395.32 |
| 2008/0232803 A1* | 9/2008 | Maier | ................ | H04O 11/0062 398/59 |
| 2009/0103550 A1* | 4/2009 | Miyata | .................. | H04L 12/427 370/400 |
| 2009/0268609 A1* | 10/2009 | Koch | .................... | H04L 12/423 370/222 |
| 2010/0195649 A1* | 8/2010 | Miyata | ................... | H04L 12/42 370/390 |

(Continued)

FOREIGN PATENT DOCUMENTS

| | | |
|---|---|---|
| CN | 1422046 | 6/2003 |
| CN | 107006045 | 8/2017 |

OTHER PUBLICATIONS

Filsfils, C., et al., "Segment Routing Architecture draft-ieff-spring-segment-routing-15," Internet Engineering Task Force (IETF), Network Working Group, Internet-Draft, pp. 1-31, Jan. 2018.

(Continued)

*Primary Examiner* — Bob A Phunkulh
(74) *Attorney, Agent, or Firm* — Perkins Coie LLP

(57) ABSTRACT

A packet communication method that generates a header that includes information to route a packet through a ring communication network is described. The header can include a target node identifier that identifies a target node to which the packet is to travel, and a direction identifier that identifies a direction to be traversed by the packet through the ring communication network. In some embodiments, the direction indicated by the direction identifier can be clockwise or counter-clockwise relative to a starting node from which the packet is to travel.

28 Claims, 6 Drawing Sheets

(56) References Cited

U.S. PATENT DOCUMENTS

| | | | | |
|---|---|---|---|---|
| 2011/0007670 | A1* | 1/2011 | Yan | H04L 12/42 370/255 |
| 2012/0195311 | A1* | 8/2012 | Gupta | H04L 12/185 370/390 |
| 2014/0254394 | A1* | 9/2014 | Hayes | H04L 12/4641 370/245 |
| 2015/0261635 | A1* | 9/2015 | Hayes | G06F 11/263 714/41 |
| 2016/0142308 | A1 | 5/2016 | Gage et al. | |
| 2017/0250908 | A1* | 8/2017 | Nainar | H04L 45/64 |
| 2019/0104048 | A1* | 4/2019 | Nainar | H04L 45/02 |

OTHER PUBLICATIONS

Previdi, S., et al., "BGP Link-State extensions for Segment Routing draft-ietf-idr-bgp-ls-segment-routing-ext-04," Internet Engineering Task Force (IETF), Inter-Domain Routing, Internet-Draft, pp. 1-27, Jan. 2018.

Previdi, S., et al., "IPv6 Segment Routing Header (SRH) draft-ietf-6man-segment-routing-header-08," Internet Engineering Task Force (IETF), Network Working Group, Internet-Draft, pp. 1-35, Jan. 2018.

Previdi, S., et al., "IS-IS Extensions for Segment Routing draft-ieff-isis-segment-routing-extensions-15," Internet Engineering Task Force (IETF), IS-IS for IP Internets, Internet-Draft, pp. 1-34, Dec. 2017.

Psenak, P., et al., "OSPF Extensions for Segment Routing draft-ietf-ospf-segment-routing-extensions-24," Internet Engineering Task Force (IETF), Open Shortest Path First IGP, Internet-Draft, pp. 1-29, Dec. 2017.

International Search Report and Written Opinion for Patent Application No. PCT/CN2019/076976, dated May 27, 2019 (10 pages).

* cited by examiner

| Outer Header 201a | Extension Header 201b | Packet Payload 201c |

| Next Header 208 | Hdr Ext Len 209 | Routing Type 210 | Segments Left 202 |
| Last Entry 207 | Flags 206 | Tag 203 | |
| Ring SID 204 ||||
| Node SID 205 ||||

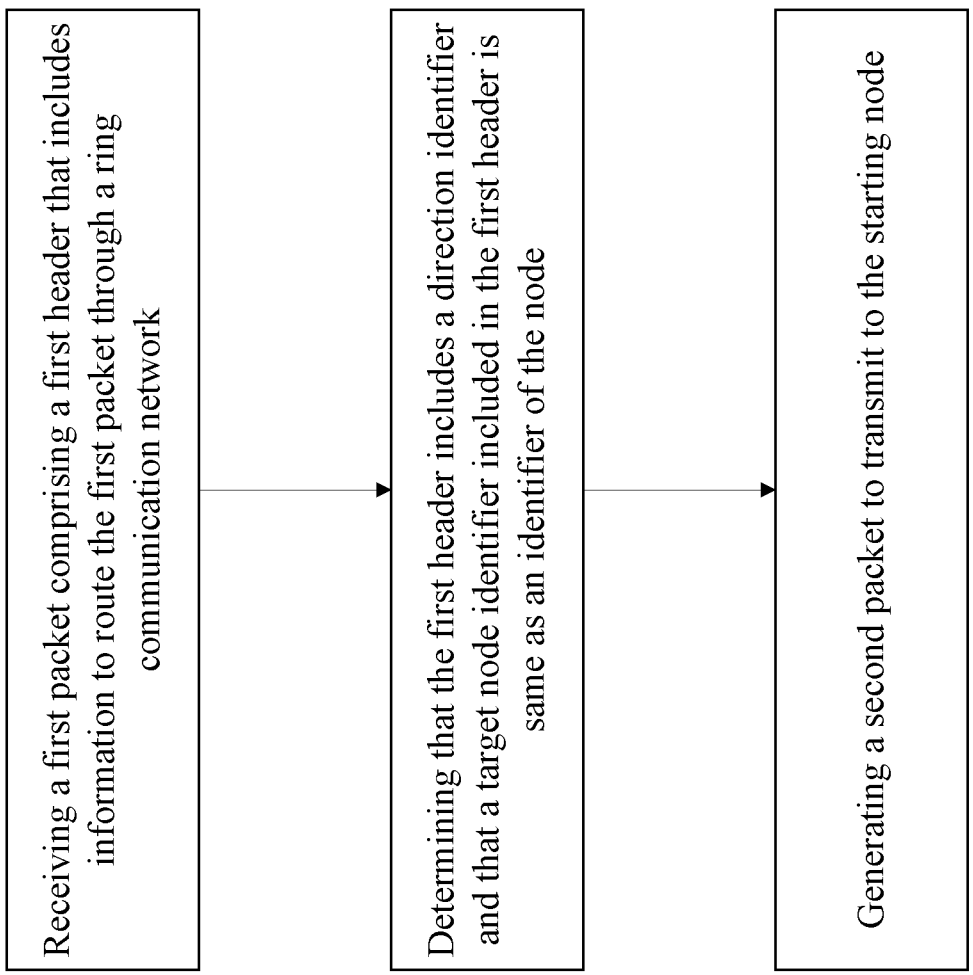

ROUTING PACKETS IN A RING COMMUNICATION NETWORK

TECHNICAL FIELD

The present document relates to traffic engineering for communications networks.

BACKGROUND

Traffic Engineering (TE) relates to performance evaluation and optimization of communications networks. A communication network may include one or more paths that can be traversed by a packet, such as an Internet Protocol (IP) packet. TE methods can be used to manage traffic flow through a communications network so that a packet can traverse a communication network.

SUMMARY

The disclosed technology can be used for efficiently routing packets in a communication network having a ring topology. Examples of implementations of the technique at a starting node, an intermediate node, and an end node of a packet are described.

In an exemplary embodiment, a packet communication method includes generating a header for a packet and transmitting the packet. The exemplary method comprises generating, by a starting node, a header for a packet, the header includes information to route the packet through a ring communication network that comprises nodes in a ring-shaped topology. The header includes at least a target node identifier that identifies a target node to which the packet is to travel, a direction identifier that identifies a direction to be traversed by the packet through the ring communication network, and a field indicative of a number of target node identifiers and a number of direction identifiers. The exemplary method includes transmitting, by the starting node, the packet to another node.

In some embodiments, the direction identified by the direction identifier is clockwise. In some other embodiments, the direction identified by the direction identifier is counter-clockwise. In some embodiments, the direction identifier has a unique value within the ring communication network.

In some embodiments, the field includes a value that describes a total of the number of target node identifiers and the number of direction identifiers. In some embodiments, the header includes a segment routing header (SRH).

In another exemplary method, a packet communication method includes receiving, by a node, a first packet comprising a first header that includes information to route the first packet through a ring communication network, determining, by the node, that the first header includes a direction identifier and that a target node identifier included in the first header is same as an identifier of the node, and generating, by the node after the determining, a second packet to transmit to the starting node.

In some embodiments, the direction identifier identifies a first direction to be traversed by the first packet through the ring communication network, and the target node identifier identifies a target node to which the first packet is to travel.

In some embodiments, the method further comprises decreasing, by the target node, a value in a field of the first header that is indicative of a number of target node identifiers and a number of direction identifiers.

In some embodiments, the second packet comprises a second header that includes a second direction identifier that identifies a second direction to be traversed by the second packet through the ring communication network, wherein the second direction opposite to the first direction identified by the first packet, and a starting node identifier that identifies the starting node to which the second packet is to travel. In some embodiments, the direction identifier and the second direction identifier have unique values within the ring communication network.

In some embodiments, in response to determining that the direction identifier is absent from the first header or that the target node identifier is different from the identifier of the node, forwarding, by the node, the first packet to the target node in response to determining that the target node identifier is associated with the ring communication network; and dropping, by the node, the first packet in response to determining that the target node identifier is unassociated with the ring communication network, In some embodiments, each of the first and second headers include a segment routing header (SRH).

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 6 shows an exemplary flowchart for processing a received packet and for generating a reply packet.

DETAILED DESCRIPTION

Figure 1:
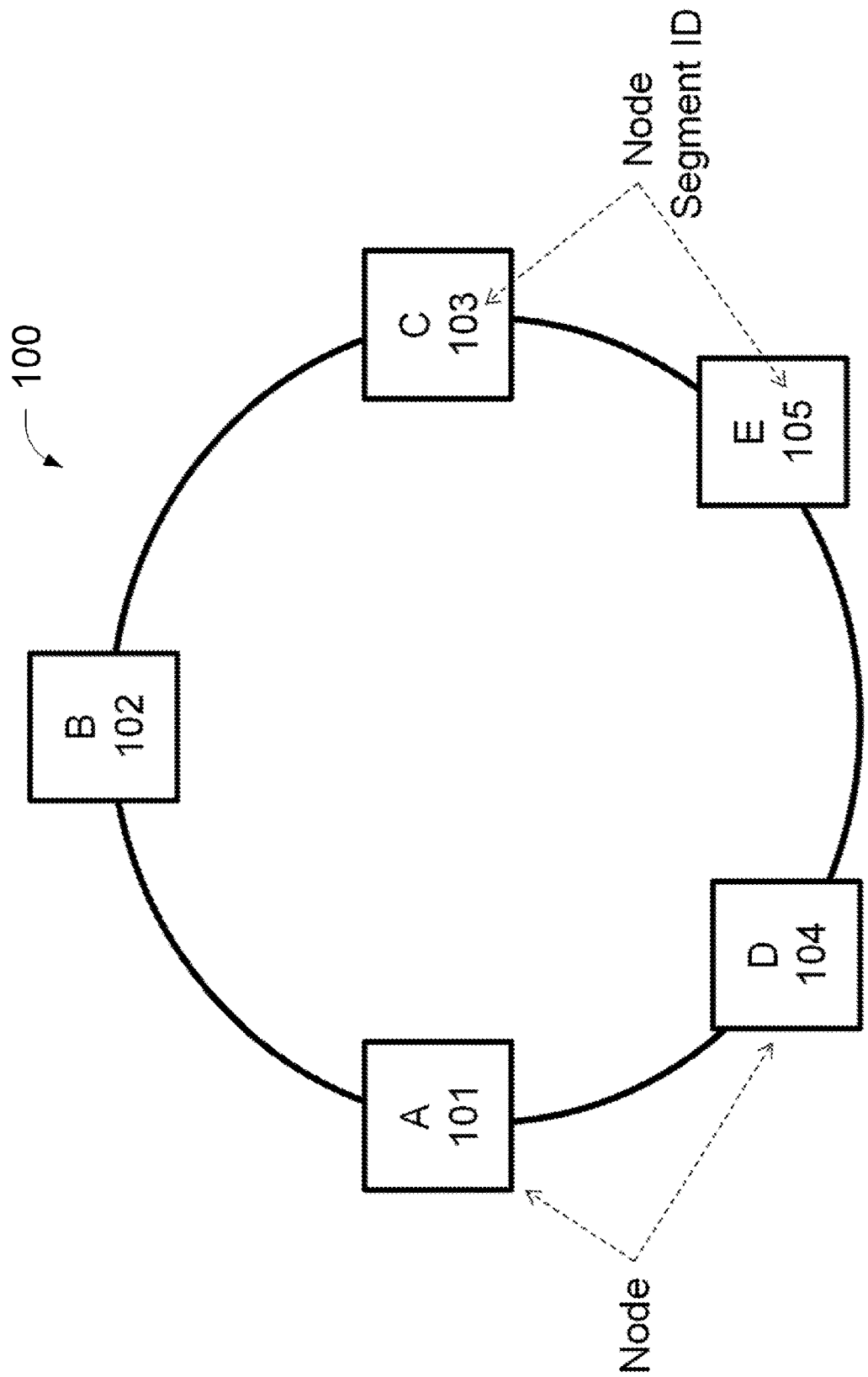
FIG. 1 shows an exemplary ring communication network 100 including communication nodes.

FIG. 1 shows an exemplary ring communication network 100 including communication nodes arranged in a ring-shaped topology. The exemplary ring communication network 100 includes five nodes—Node A, Node B, Node C, Node D, and Node E. A node can be a router or a computer host system or any other communication equipment in the ring communication network 100. Each node in the ring communication network is assigned a Node Segment Identification (SID). The SID may be unique within the ring communication network. In FIG. 1, the SID for Node A is 101, the SID for Node B is 102, the SID for Node C is 103, and so on. The ring communication network 100 of FIG. 1 can use segment routing (SR) to instantiate a TE path by steering one or more packets over segments identified by SIDs.

A communication network having a ring topology can provide certain benefits. A ring topology network can provide native protection path in single failure scenario to working paths between any two nodes connected to the ring. For example, when a segment becomes unavailable, two nodes may be able to maintain communication without disruption, by changing from a clockwise route to a counter-clockwise route and vice versa. Thus, ring topology networks are commonly used elements in building access and metro area networks. A ring topology network can also allow simplification for traffic flow management because the physical ring can be presented as combination of two unidirectional rings—a clockwise direction and another counter-clockwise direction of data flow. SR can be used to instantiate a TE path along a ring topology network so that a packet can be steered from a starting node to a target another in a clockwise direction or a counter-clockwise direction.

Using TE techniques, a path can be either pre-signaled or defined by a set of instructions included into the data packet, also known as source routing. As a data plane control method, TE can be considered an alternative to the hop-by-hop route method. However, unlike in a hop-by-hop method, using conventional TE techniques in a ring communication network may lead to a packet that may not be routed using the best route. Further, as explained below, failure detection and performance monitoring using request-reply protocols in a ring communication network may also produce uncertain and unreliable results.

A ring communication network may include IPv6 networks. A packet that traverses an IPv6 network can include an IPv6 header, an IPv6 extension header, and a payload. An IPv6 outer header can include a source IP address and a destination IP address. An example of an IPv6 extension header is a Segment Routing Header (SRH) that can be used by SR in an IPv6 network to list segments identified by SIDs and traversed by the payload data. Using conventional TE techniques, the segments (paths) are unidirectional, and for Operations, Administration, and Maintenance (OAM) protocols that use request-reply model, the reply message is transmitted using the best route selected by each network node.

FIG. 1 can be used to further illustrate the issues with current TE techniques in a ring communication network. In FIG. 1, if a test packet is sent over SR path from Node A to Node D to Node E to Node C using current TE techniques, then a reply test packet can follow the best route Node C to Node B to Node A using a hop-by-hop method. Thus, using current TE techniques, a reply OAM packet may not be able to traverse the same path in reverse direction as the path traveled by the original request OAM packet.

Furthermore, if the test packet was used to calculate the propagation delay over the SR path by measuring the round-trip time, the result may not be accurate at least because in this example the round trip time will include the whole ring (e.g., Nodes A to D to E to C to B to A) and not just the co-routed path (e.g., Nodes A to D to E to C to E to D to A). In another example, using a request-reply mechanism to detect failure in the SR path may produce a false negative result if the segments including Nodes C to B to A have failed but a packet may only need to traverse one or more segments between Nodes A to D to E to C. The embodiments described in this patent document describe techniques and apparatus that can allow a reply test packet to traverse the same SR nodes as the corresponding request test packet.

In FIG. 1, the ring communication network domain can use segment routing architecture and IPv6 addressing in the data plane. In an exemplary embodiment, each SR ring can have a domain-wide unique Ring SID that can identify a packet routing direction. For example, in the ring communication network 100, a clockwise Ring SID can be 150 and a counter-clockwise Ring SID can be 175. The Node SID associated with each node can be a domain-wide unique Node SID. Each node in the ring communication network 100 can advertise its Node SID using, for example, Interior Gateway Protocol (IGP), Intermediate System to Intermediate System (IS-IS), Open Shortest Path First (OSPF), or Border or Exterior Gateway Protocol (BGP), using SR extensions in association with Ring SIDs.

Figure 2A:
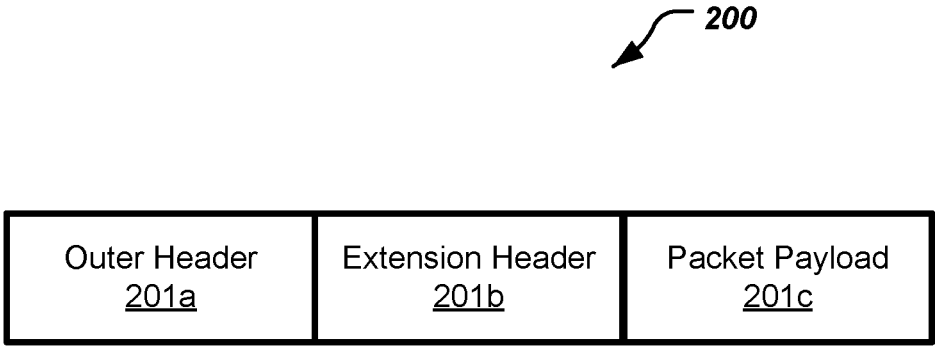
FIG. 2A shows a packet generated by a node that includes a Segment Routing Header (SRH) and a packet payload.

FIG. 2A shows a packet 200 generated by a node that includes an outer header 201a, an extension header 201b, such as an SRH and a packet payload 201c. In an exemplary embodiment, a starting node or an originator of a OAM request message, such as Node A in FIG. 1, can construct a packet that includes an SRH as shown in FIG. 2A.

Figure 2B:
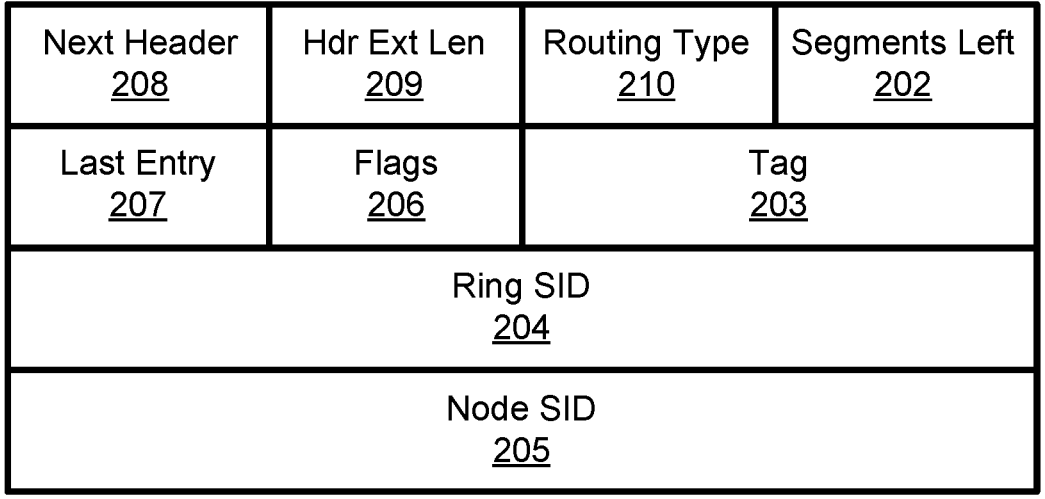
FIG. 2B shows an exemplary format for an SRH.

FIG. 2B shows an exemplary format of an SRH 201b for a packet where the SRH includes a Ring SID. The Ring SID field 204 can identify the direction in which a packet can traverse one or more nodes. The direction identifier associated with the Ring SID field 204 can describe a clockwise direction or a counter-clockwise direction for traversal by a packet. A Node SID field 205 can identify a target node to which the test request packet is to travel. Continuing with the example and values described above, if the test request packet's path is Nodes A to D to E to C in FIG. 1, then in some embodiments, the starting node can generate a SRH with a Ring SID of 175 and a Node SID of 103.

The Last Entry field 207 can identify an index of the last element of the segment list. The one or more Ring SIDs and one or more Node SIDs can be indexed so that the Last Entry field 207 can provide information about the number of SIDs included as a segment list in the SRH. In the example described above, the Last Entry field 207 can include a value associated with index 1, where index 0 can represent the index associated with the Ring SID and index 1 can represent the index associated with the Node SID for Node C.

The Segments Left field 202 in the SRH can be populated by the starting node and the target node in their respective test packet SRHs. The Segments Left field 202 can include a value for a number of identifiers that describes a total of a number of Ring and Node SIDs that are listed in the SRH and that describe a path to be traversed by the packet to reach the target node. Thus, in the example described above, a starting node can generate a Segments Left field 202 with a value corresponding to two SIDs that refer to the presence of a Ring SID 175 and a Node SID 103 for a packet to reach target Node C.

In some other embodiments, a starting node can generate a SRH with two or more Ring SIDs and two or more Node SIDs to further specify the test request packet's path. For example, if the test request path is Nodes A to D to E to C in FIG. 1, and if the starting node wants to specify traversal of the packet from Node A to D to C, then in some embodiments, the starting node can generate a SRH with a Ring SID of 175 and a Node SID of 104, followed by a Ring SID of 175 and a Node SID of 103. In the example provided for this embodiment, the Last Entry field 207 can include a value associated with index 3, where index 0 can represent the index associated with the first Ring SID, index 1 can represent the index associated with the Node SID for Node D, index 2 can represent the index associated with the second Ring SID, and index 3 can represent the index associated with the Node SID for Node C. Further, in the example provided for this embodiment, a starting node can generate a Segments Left field 202 with a value corresponding to four SIDs that refer to the presence of a first Ring SID of 175, a Node SID of 104, a second Ring SID of 175 and a Node SID of 103 for a packet to reach target Node C.

When the target node receives the test request packet, the target node can generate a reply test packet that includes a SRH with a Ring SID that is complementary of the Ring SID selected by the starting node. By using a complementary Ring SID, the target node can create the SRH that describes a direction that is the opposite or reverse of the path and nodes traversed by the packet generated by the starting node. Thus, Ring SID used by the target node can allow the reply test packet to traverse the same nodes and links as the original request test packet generated by the starting node. Using the above example, when a Node C receives the test request packet, Node C will generate a reply test packet including a SRH with a Ring SID of 150 and a Node SID of 101. The target node can also include in the SRH values for the Segment Left field 202 and the Last Entry field 207 as described in this patent document. In some embodiments, the target node can generate the test reply packet after the target node decreases to zero the Segments Left field 202.

The Next Header field 208 can identify the type of header that follows the SRH. The Hdr Ext Len field 209 can identify the length of the SRH header. The Routing Type field 210 identifies the type of the Extension Header. The value for the Routing Type field 210 is determined by Internet Assigned Number Authority (IANA) and should be interpreted as Segment Routing. The Flags field 206 can identify one or more flags. The Tag field 203 can tag a packet as part of a class or group of packets.

A Ring SID field 204 can be shared by all nodes in communication with a ring communication network. As a result, in an exemplary embodiment as further illustrated in FIG. 3, a node can process a Ring SID in IPv6 SRH differently from an IPv6 SRH processed by conventional TE techniques.

A starting node can transmit a generated packet including an outer header and an SRH to be sent to a target node based on the direction indicated by the direction identifier, such as the Ring SID, and based on the target Node SID. The starting node can include the IP address of the target node as the destination IP address in the outer header of the packet and can then send the packet to the target node.

Figure 3:
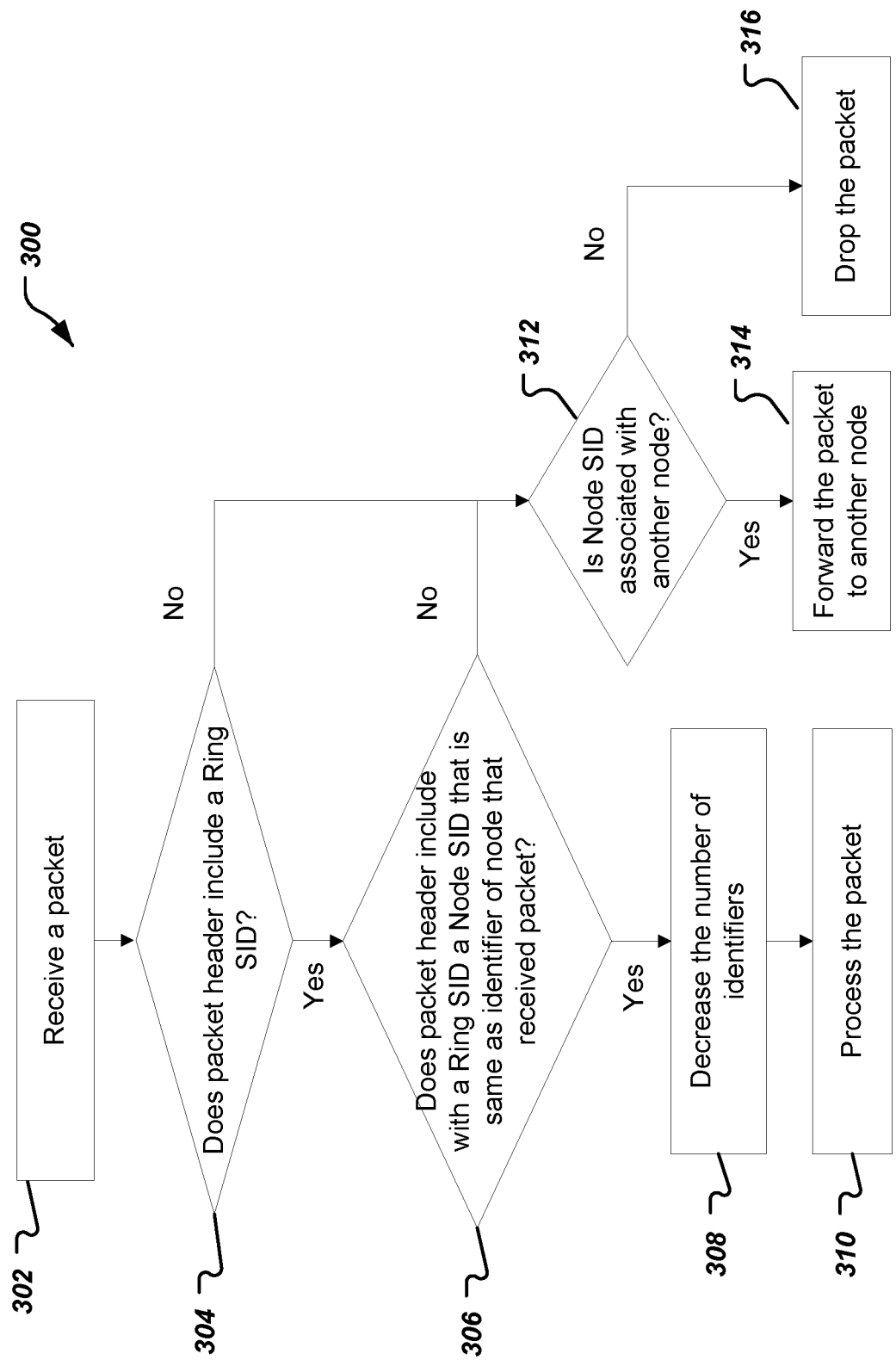
FIG. 3 illustrates an exemplary flowchart for processing a header for a ring communication network.

FIG. 3 illustrates an exemplary flowchart 300 for processing a header for a ring communication network. At the receiving operation 302, a node in a ring communication network can receive a packet comprising a header that includes information to route the packet through the ring communication network. At the determining operation 304, the node can determine whether the header includes a direction identifier, such as the Ring SID, that identifies a direction traversed by the packet through one or more nodes of the ring communication network. The direction indicated by the direction identifier can be clockwise or counterclockwise relative to a starting node from which the packet is to travel.

If the node determines that the header includes a direction identifier, then the node performs a second determining operation 306 where the node determines whether a target node identifier that is included in the header and that can be listed after the direction identifier is same as an identifier of the node that received the packet. The target node identifier identifies a target node to which the packet is to travel. If the node determines that the Ring SID is absent from the header, then the node performs the third determining operation 312, as further described below.

If the node determines that the target node identifier is the same as the identifier of the node, then the node can perform the decreasing operation 308 by decreasing by a predetermined value a value that represents a number of identifiers. The number of identifiers can describe a total of a number of target node identifiers and a number of direction identifiers that describe a path to be traversed by the packet to reach the target node. As mentioned above, in some embodiments, an SRH may include more than one target node SIDs and more than one Ring SIDs. At a final target node, the value of the Segments Left field in the IPv6 SRH equals zero after the value representing the number of identifiers is decremented by an example predetermined value of two. If the node determines that the target node identifier is not the same or different from the identifier of the node, then the node performs the third determining operations 312, as further described below.

At the processing operation 310, the target node passes the test request packet to an appropriate OAM protocol for processing. As an example, in some embodiments, the packet may be processed by a target node by decapsulating the packet and passing the decapsulated packet to a control plane for further processing. As another example, processing may include the target node generating a test packet with copies of some characteristic information from the received request and adding information, for example, sequence number, time values, in support of performance measurement over the traversed nodes, such as the example span of Nodes A to D to E to C as described above.

As part of the processing operation 310, a test reply packet can be constructed by the target node using the OAM protocol. To allow the reply test packet to traverse the same nodes and paths on the ring as the received packet, the target node can generate a packet with an outer header and an extension header, such as an SRH. The extension header of the reply packet can include a Ring SID that indicates a direction opposite to the Ring SID listed in the original IPv6 SRH packet sent by the starting node. Thus, the extension header of the reply packet can indicate a direction that is reverse to or opposite of the direction traversed by the received packet. Further, the target node can list the Node SID of the starting node in the extension header of the reply test packet. The target node can also list IP address of the starting node in the IP destination address of the outer header of the reply test packet. The reply test packet can include additional information as described above in FIGS. 2A and 2B. Thus, using the example described above, the IPv6 SRH of the test reply packet can be transported over segment route that includes Nodes C to E to D to A. In some embodiments, the target node can generate the test reply packet after the target node decreases to zero the value that represents a number of identifiers.

If a node determines that the direction identifier is absent from the header, as described in determining operation 304, or if the node determines that the target node identifier that can be listed after the direction identifier is different from the identifier of the node, as described in the second determining operation 306, then the node can perform a third determining operation 312 to determines whether the target node identifier is associated with another node in the ring communication network. Segment Routing extensions to interior gateway protocol (IGP), such as OSPF or IS-IS, advertise throughout the IGP domain the association between the SID and SR Rings, such as the Node SIDs or the Ring SIDs. At the third determining operation 312, if the node determines that it can reach the target node, then the node can perform a forwarding operation 314 by adding the IP address of the target node to the destination IP address in the outer header and then forward the packet to the target node. At the third determining operation 312, if the node determines that it cannot reach the target node, then the node can perform a dropping operation 316 and drop the packet since the packet may be erroneously generated with an SRH header.

Figure 4:
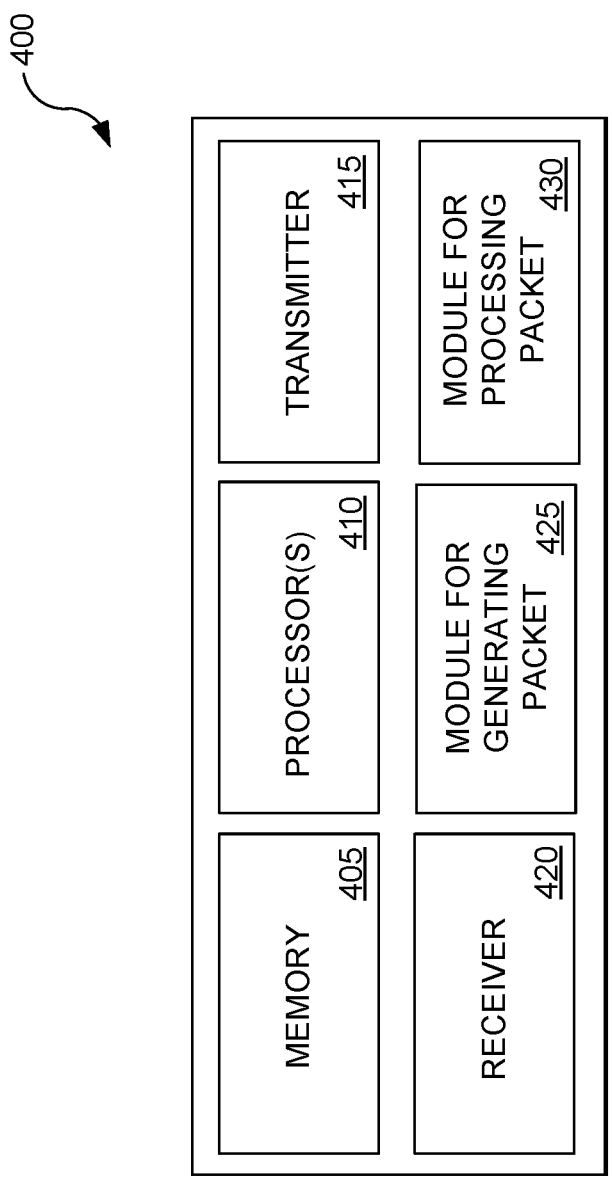
FIG. 4 shows a block diagram for an exemplary packet communication apparatus.

FIG. 4 shows a block diagram for an exemplary packet communication apparatus 400. The packet communication apparatus 400 includes at least one processor 410 and can have a memory 405 having instructions stored thereupon, wherein the instructions upon execution by the at least one processor, configure the apparatus to perform one or more operations as described in FIGS. 2 and 3. The packet communication apparatus 400 can be a node that can generate or process a packet comprising a header. The packet communication apparatus 400 includes a transmitter 415 and a receiver 420 for transmitting and receiving packets in a communication network, such a ring communication network. The module for generating packet 425 can generate a packet that includes an outer header and an extension header, such as a SRH. The extension header may include at least the Ring SID, Node SID, and Segments Left information, as described in FIG. 2B. In some embodiments, the module for generating packet 425 can also include in the extension header additional information, such as Tag, Flags, Last Entry, Next Header, Hdr Ext Len, and Routing Type as described in FIG. 2B. For example, for a reply test packet generated by a target node, some of the values of the six above mentioned fields can be copied from the corresponding fields of the received test packet, while some other fields, such as Routing Type can be set to pre-determined value to indicate segment routing. The module for processing packets 430 can process the packets with the header information, as described in FIG. 3. For example, the module for processing packets 430 can perform the operations associated with the determining operations 304, 306, and 312 as described in FIG. 3.

The module for processing packet 430 can perform one or more operations associated with the processing operation 310 as described in FIG. 3. For example, the module for processing packet 430 can decapsulate (e.g., separating a portion of header and the remaining packet) and forward a packet for processing, or use the module for generating packet 425 to generate a reply test packet.

Figure 5:
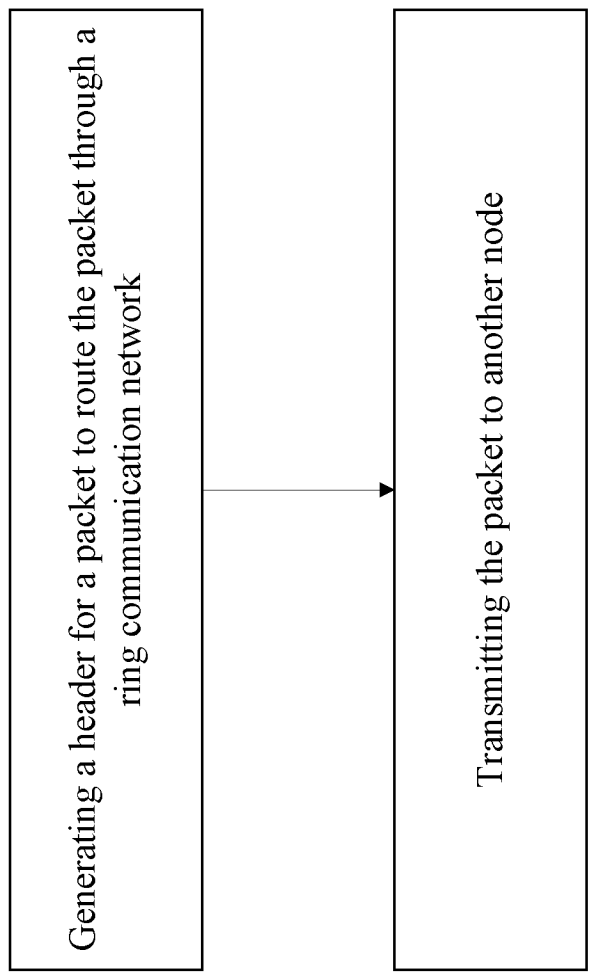
FIG. 5 shows an exemplary flowchart for generating a packet.

FIG. 5 shows an exemplary flowchart for generating a packet. At the generating operation 502, a header for a packet is generated by a starting node. The header includes information to route the packet through a ring communication network that comprises nodes in a ring-shaped topology. The header can include a SRH that includes at least a target node identifier, a direction identifier, and a field indicative of a number of identifiers. The target node identifier identifies a target node to which the packet is to travel, the direction identifier identifies a direction to be traversed by the packet through the ring communication network, and the field is indicative of a number of target node identifiers and a number of direction identifiers.

In some embodiments, the direction identified by the direction identifier is clockwise. In some other embodiments, the direction identified by the direction identifier is counter-clockwise. The direction identifier can have a unique value within the ring communication network. The field can include a value that describes a total of the number of target node identifiers and the number of direction identifiers.

At the transmitting operation 502, the packet is transmitted by a starting node to another node. The transmission may be performed on a network with ring topology such as a metro ring network.

FIG. 6 shows an exemplary flowchart for processing a received packet and for generating a reply packet. At the receiving operation 602, a node receives a first packet that comprises a first header. The first header includes information to route the first packet through a ring communication network. At the determining operation 604, the node determines that the first header includes SRH that comprises a direction identifier and that a target node identifier included in the first header is same as an identifier of the node. The direction identifier identifies a first direction to be traversed by the first packet through the ring communication network, and the target node identifier identifies a target node to which the first packet is to travel. In some embodiments, the direction identified by the direction identifier is clockwise. In some other embodiments, the direction identified by the direction identifier is counter-clockwise.

After the determining operation 604, at the generating operation 606, the node generates a second packet to transmit to the starting node. The second packet can include a second header that includes SRH that comprises a second direction identifier and a starting node identifier. The second direction identifier identifies a second direction to be traversed by the second packet through the ring communication network. The second direction can be opposite to the first direction identified by the first packet. The starting node identifier identifies the starting node to which the second packet is to travel. In some embodiments, the direction identifier and the second direction identifier have unique values within the ring communication network.

In some embodiments, after the determining operation 604, the node can decrease a value in a field of the first header that is indicative of a number of target node identifiers and a number of direction identifiers.

In some embodiments, the above described methods may be implemented by a communication apparatus. The communication apparatus may include a processor configured to implement the various methods described herein. The communication apparatus may be as described with respect to FIG. 4. The processor may perform packet processing as described herein and control a network interface to transmit or receive the packets.

The term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A packet communication method, comprising:
    generating, by a starting node, a header for a packet, the header includes information to route the packet through a ring communication network that comprises nodes in a ring-shaped topology, wherein the header includes at least:
        one or more target node identifiers that identify one or more target nodes to which the packet is to travel,
        one or more direction identifiers that identify one or more directions to be traversed by the packet through the ring communication network, wherein each of the one or more target node identifiers and the one or more direction identifiers is associated with an index value,
        a first field includes a value that describes a total of a number of the one or more target node identifiers and a number of the one or more direction identifiers, and
        a second field that includes a last index value associated with a last identifier in a list of the one or more target node identifiers and the one or more direction identifiers; and
    transmitting, by the starting node, the packet to another node.

2. The packet communication method of claim 1, wherein a direction identified by the one or more direction identifiers is clockwise.

3. The packet communication method of claim 1, wherein a direction identified by the one or more direction identifiers is counter-clockwise.

4. The packet communication method of claim 1, wherein each of the one or more direction identifiers has a unique value within the ring communication network.

5. The packet communication method of claim 1, wherein the header includes a segment routing header (SRH).

6. A packet communication method, comprising:
    receiving, by a node from a starting node, a first packet comprising a first header that includes information to route the first packet through a ring communication network;
        wherein the first header includes one or more target node identifiers that identify one or more target nodes to which the first packet is to travel,
        wherein the first header includes one or more direction identifiers that identify one or more directions to be traversed by the first packet through the ring communication network;
        wherein each of the one or more target node identifiers and the one or more direction identifiers is associated with an index value,
        wherein the first header comprises a first field that includes a value that describes a total of a number of the one or more target node identifiers and a number of the one or more direction identifiers, and
        wherein the first header comprises a second field that includes a last index value associated with a last identifier in a list of the one or more target node identifiers and the one or more direction identifiers;
    determining, by the node, that the first header includes a direction identifier and that a target node identifier included in the first header is same as an identifier of the node; and
    generating, by the node after the determining, a second packet to transmit to the starting node that sent the first packet.

7. The packet communication method of claim 6, wherein the direction identifier identifies a first direction to be traversed by the first packet through the ring communication network, and
    the target node identifier identifies a target node to which the first packet is to travel.

8. The packet communication method of claim 7, wherein the second packet comprises a second header that includes:
    a second direction identifier that identifies a second direction to be traversed by the second packet through the ring communication network, wherein the second direction opposite to the first direction identified by the first packet, and
    a starting node identifier that identifies the starting node to which the second packet is to travel.

9. The packet communication method of claim 8, wherein the direction identifier and the second direction identifier have unique values within the ring communication network.

10. The packet communication method of claim 6, wherein the direction identified by the direction identifier is clockwise.

11. The packet communication method of claim 6, wherein the direction identified by the direction identifier is counter-clockwise.

12. The packet communication method of claim 6, further comprising:
decreasing, by the node, a value in the first field of the first header.

13. The packet communication method of claim 6, wherein in response to determining that the direction identifier is absent from the first header or that the target node identifier is different from the identifier of the node:
forwarding, by the node, the first packet to the target node in response to determining that the target node identifier is associated with the ring communication network; and
dropping, by the node, the first packet in response to determining that the target node identifier is unassociated with the ring communication network.

14. The packet communication method of claim 6, wherein each of the first and second headers include a segment routing header (SRH).

15. A packet communication apparatus comprising a processor configured to:
generate a header for a packet, the header comprising information to route the packet through a ring communication network that comprises nodes in a ring-shaped topology, wherein the header includes at least:
one or more target node identifiers that identify one or more target nodes to which the packet is to travel,
one or more direction identifiers that identify one or more directions to be traversed by the packet through the ring communication network,
wherein each of the one or more target node identifiers and the one or more direction identifiers is associated with an index value,
a first field includes a value that describes a total of a number of the one or more target node identifiers and a number of the one or more direction identifiers, and
a second field that includes a last index value associated with a last identifier in a list of the one or more target node identifiers and the one or more direction identifiers; and
transmit the packet to a node.

16. The packet communication apparatus of claim 15, wherein a direction identified by the one or more direction identifiers is clockwise.

17. The packet communication apparatus of claim 15, wherein a direction identified by the one or more direction identifiers is counter-clockwise.

18. The packet communication apparatus of claim 15, wherein each of the one or more direction identifiers has a unique value within the ring communication network.

19. The packet communication apparatus of claim 15, wherein the header includes a segment routing header (SRH).

20. A packet communication apparatus comprising a processor configured to:
receive, by a node from a starting node, a first packet comprising a first header that includes information to route the first packet through a ring communication network,
wherein the first header includes one or more target node identifiers that identify one or more target nodes to which the first packet is to travel,
wherein the first header includes one or more direction identifiers that identify one or more directions to be traversed by the first packet through the ring communication network;
wherein each of the one or more target node identifiers and the one or more direction identifiers is associated with an index value,
wherein the first header comprises a first field that includes a value that describes a total of a number of the one or more target node identifiers and a number of the one or more direction identifiers, and
wherein the first header comprises a second field that includes a last index value associated with a last identifier in a list of the one or more target node identifiers and the one or more direction identifiers:
determine that the first header includes a direction identifier and that a target node identifier included in the first header is same as an identifier of the node;
generate a second packet to transmit to the starting node that sent the first packet.

21. The packet communication apparatus of claim 20, wherein
the direction identifier identifies a first direction to be traversed by the first packet through the ring communication network, and
the target node identifier identifies a target node to which the first packet is to travel.

22. The packet communication apparatus of claim 21, wherein the second packet comprises a second header that includes:
a second direction identifier that identifies a second direction to be traversed by the second packet through the ring communication network, wherein the second direction opposite to the first direction identified by the first packet, and
a starting node identifier that identifies the starting node to which the second packet is to travel.

23. The packet communication apparatus of claim 20, wherein the direction identified by the direction identifier is clockwise.

24. The packet communication apparatus of claim 20, wherein the direction identified by the direction identifier is counter-clockwise.

25. The packet communication apparatus of claim 20, wherein the memory stores additional instructions that, when executed, cause the processor to:
decrease a value in the first field of the first header.

26. The packet communication apparatus of claim 20, wherein the direction identifier and the second direction identifier have unique values within the ring communication network.

27. The packet communication apparatus of claim 20, wherein the memory stores additional instructions that, when executed, cause the processor to:
in response to a determination of the direction identifier being absent from the first header or the target node identifier being different from the identifier of the node:
forward the first packet to the target node in response to the target node identifier being associated with the ring communication network; and
drop the first packet in response to the target node identifier being unassociated with the ring communication network.

28. The packet communication apparatus of claim 20, wherein each of the first and second headers include a segment routing header (SRH).

* * * * *

UNITED STATES PATENT AND TRADEMARK OFFICE
CERTIFICATE OF CORRECTION

PATENT NO. : 10,938,964 B2
APPLICATION NO. : 15/912512
DATED : March 2, 2021
INVENTOR(S) : Gregory Mirsky Page 1 of 1

It is certified that error appears in the above-identified patent and that said Letters Patent is hereby corrected as shown below:

On the Title Page

Item (56), under "OTHER PUBLICATIONS", in Column 2, Line 1, delete "draft-ieff-spring-" and insert -- draft-ietf-spring- --, therefor.

On Page 2, item (56), under "OTHER PUBLICATIONS", in Column 2, Line 8, delete "ieff-isis-segment" and insert -- ietf-isis-segment --, therefor.

In the Specification

In Column 7, Line 16, delete "such a ring" and insert -- such as ring --, therefor.

In Column 8, Line 55, delete "(DVD)," and insert -- (DVDs), --, therefor.

In the Claims

In Column 10, Line 23, in Claim 6, delete "network;" and insert -- network, --, therefor.

In Column 10, Line 30, in Claim 6, delete "network;" and insert -- network, --, therefor.

In Column 12, Line 4, in Claim 20, delete "network;" and insert -- network, --, therefor.

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*